US012232448B2

(12) United States Patent
Lucca (10) Patent No.: US 12,232,448 B2
(45) Date of Patent: Feb. 25, 2025

(54) AGRICULTURAL SYSTEM AND METHOD FOR AUTOMATICALLY DETERMINING LOSSES FOR HARVESTING OPERATIONS

(71) Applicant: CNH Industrial America LLC, New Holland, PA (US)

(72) Inventor: João Augusto Marcolin Lucca, São Pedro (BR)

(73) Assignee: CNH Industrial America LLC, Holland, PA (US)

( * ) Notice: Subject to any disclaimer, the term of this patent is extended or adjusted under 35 U.S.C. 154(b) by 268 days.

(21) Appl. No.: 17/993,426

(22) Filed: Nov. 23, 2022

(65) Prior Publication Data

US 2023/0157209 A1 May 25, 2023

(30) Foreign Application Priority Data

Nov. 25, 2021 (BR) ...................... 10 2021 023703 1

(51) Int. Cl.
A01D 45/10 (2006.01)
G06V 20/10 (2022.01)

(52) U.S. Cl.
CPC ........... *A01D 45/10* (2013.01); *G06V 20/188* (2022.01)

(58) Field of Classification Search
CPC .... A01D 45/10; A01D 41/127; A01D 43/085; G06V 20/188; G06V 10/143; G01M 99/005; G01M 99/008
See application file for complete search history.

(56) References Cited

U.S. PATENT DOCUMENTS

| 5,138,819 A | 8/1992 | André |
| 8,452,501 B1 | 5/2013 | Lange et al. |
| 9,317,979 B2 | 4/2016 | Halmann |
| 9,781,880 B2 | 10/2017 | Cleodolphi et al. |

(Continued)

FOREIGN PATENT DOCUMENTS

| CN | 106292272 | 1/2017 |
| CN | 106651779 | 5/2017 |

(Continued)

OTHER PUBLICATIONS

Milsom et al, A. Assessing the Ability of a Stationary Pasture Height Sensing Device to Estimate Pasture Growth and Biomass, Google Scholar, Lincoln University, Workshop on New Technology, Apr. 2019, pp. 61-68. (Year: 2019).*

*Primary Examiner* — Russell Frejd
(74) *Attorney, Agent, or Firm* — Peter K. Zacharias; Rebecca L. Henkel; Rickard K. DeMille (57) ABSTRACT

An agricultural system for automatically determining losses for harvesting operations includes a loss sensor supported on an agricultural harvester and having a field of view directed toward a portion of a field aft of a base cutter of the agricultural harvester, where the loss sensor is configured to generate data indicative of ground losses. Additionally, the agricultural system includes a computing system communicatively coupled to the loss sensor. The computing system is configured to identify non-height related ground losses during a harvesting operation of the agricultural harvester based at least in part on the data generated by the loss sensor. Additionally, computing system is configured to initiate a control action in response to the non-height related ground losses.

20 Claims, 5 Drawing Sheets

(56) References Cited

U.S. PATENT DOCUMENTS

| | | |
|---|---|---|
| 9,832,928 B2 | 12/2017 | Dybro et al. |
| 10,049,296 B2 | 8/2018 | Walker |
| 10,209,235 B2 | 2/2019 | Cotton et al. |
| 2018/0035611 A1 | 2/2018 | D'Arrigo et al. |
| 2019/0373814 A1* | 12/2019 | Murray .................. A01D 43/08 |
| 2020/0128749 A1* | 4/2020 | Nicora .................. A01D 43/105 |
| 2021/0015043 A1 | 1/2021 | Carlson et al. |
| 2023/0189706 A1* | 6/2023 | Murray .................. A01D 45/10 |
| | | 56/10.2 R |
| 2023/0276730 A1* | 9/2023 | Barretto .................. A01D 33/14 |
| | | 56/10.1 |

FOREIGN PATENT DOCUMENTS

| | | |
|---|---|---|
| DE | 2654141 | 6/1978 |
| EP | 2545761 B1 | 12/2016 |
| EP | 3494771 B1 | 12/2020 |

\* cited by examiner

AGRICULTURAL SYSTEM AND METHOD FOR AUTOMATICALLY DETERMINING LOSSES FOR HARVESTING OPERATIONS

CROSS-REFERENCE TO RELATED APPLICATION

This application claims the benefit of priority to Brazilian Patent Application No. BR 10 2021 023703 1, entitled "AGRICULTURAL SYSTEM AND METHOD FOR AUTOMATICALLY DETERMINING LOSSES FOR HARVESTING OPERATIONS", filed Nov. 25, 2021, which is hereby incorporated by reference herein in its entirety for all purposes.

FIELD OF THE INVENTION

The present disclosure relates generally to agricultural systems and methods for automatically determining losses for harvesting operations and, more particularly, to automatically identifying non-height related ground losses, such as one or more of exposed roots, shattered ratoons, fixed stalks, fallen stalks, or fallen stalk segments, and cut height-related ground losses during a harvesting operation.

BACKGROUND OF THE INVENTION

Typically, agricultural harvesters include an assembly of processing equipment for processing harvested crop materials. For instance, a sugarcane harvester typically includes a base cutter assembly configured to sever sugarcane stalks, the severed sugarcane stalks are then conveyed via a feed roller assembly to a chopper assembly that cuts or chops the sugarcane stalks into pieces or billets (e.g., 6 inch cane sections). The processed crop material discharged from the chopper assembly is then directed as a stream of billets and debris into a primary extractor, within which the airborne debris (e.g., dust, dirt, leaves, etc.) is separated from the sugarcane billets. The separated/cleaned billets then fall into an elevator assembly for delivery to an external storage device.

During a harvesting operation with the harvester, different ground losses may occur. For instance, when the base cutter is too high, some of the harvestable stalk is left behind, which reduces the overall yield for the harvesting operation. When the base cutter is too low, the base cutter may cause the stalk to at least partially uproot and/or otherwise damage the ratoon for future growth. When the ground speed of the harvester is too fast and/or the base cutter blades are dull, the ratoons may shatter. Moreover, some stalks may pass below a first roller of a roller assembly of the harvester, leaving partial or full stalks on the ground. Additionally, some stalks may have been knocked down before the harvester, and are thus, left unsevered in the field. Typically, these different losses are only able to be manually evaluated after a harvesting operation is completed. Such manual evaluation is time-consuming and can only be done for a relatively small area and does not allow for losses to be evaluated and prevented during a harvesting operation.

Accordingly, an agricultural system and method for automatically determining losses for harvesting operations would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural system for automatically determining losses for harvesting operations. The agricultural system includes a loss sensor supported on an agricultural harvester and having a field of view directed toward a portion of a field aft of a base cutter of the agricultural harvester, where the loss sensor is configured to generate data indicative of ground losses. Additionally, the agricultural system includes a computing system communicatively coupled to the loss sensor. The computing system is configured to identify non-height related ground losses during a harvesting operation of the agricultural harvester based at least in part on the data generated by the loss sensor. Additionally, computing system is configured to initiate a control action in response to the non-height related ground losses.

In another aspect, the present subject matter is directed to an agricultural method for automatically determining losses for harvesting operations. The agricultural method includes receiving, with a computing system, data from a loss sensor supported on an agricultural harvester, where the loss sensor has a field of view directed toward a portion of a field aft of a base cutter of the agricultural harvester. The agricultural method further includes identifying, with the computing system, ground losses during a harvesting operation of the agricultural harvester based at least in part on the data from the loss sensor. Additionally, the agricultural method includes initiating, with the computing system, a control action in response to the non-height related ground losses.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to agricultural systems and methods for automatically determining losses of harvesting operations. More particularly, in several embodiments, a loss sensor (e.g., a camera) may be positioned on an agricultural harvester and have a field of view directed rearward of a base cutter of the agricultural harvester such that the loss sensor is configured to generate data indicative of ground losses during the performance of a harvesting operation, particularly those present at the base cutter. A computing system may be configured to identify the ground losses of the harvesting operation based at least in part on the data from the loss sensor. For instance, the computing system may be able to identify non-height related ground losses based on the data from the loss sensor, such as one or more of exposed roots, shattered ratoons, fixed stalks, fallen stalks, or fallen stalk segments. In some instances, the computing system may also be able to identify cut height-related ground losses based at least in part on the data from the loss sensor. Based on the identified ground losses, the computing system may automatically initiate a control action, such as one or more of raising the base cutter, reducing a ground speed of the harvester, or controlling an operation of a user interface. Using the loss sensors allows for the ground losses to automatically be identified during an agricultural operation, which significantly reduces the time it takes to account for ground losses while increasing the accuracy of ground loss estimation, and allows for adjustments to reduce further ground losses, particularly the non-height related ground losses that may affect subsequent harvesting operations.

Figure 1:
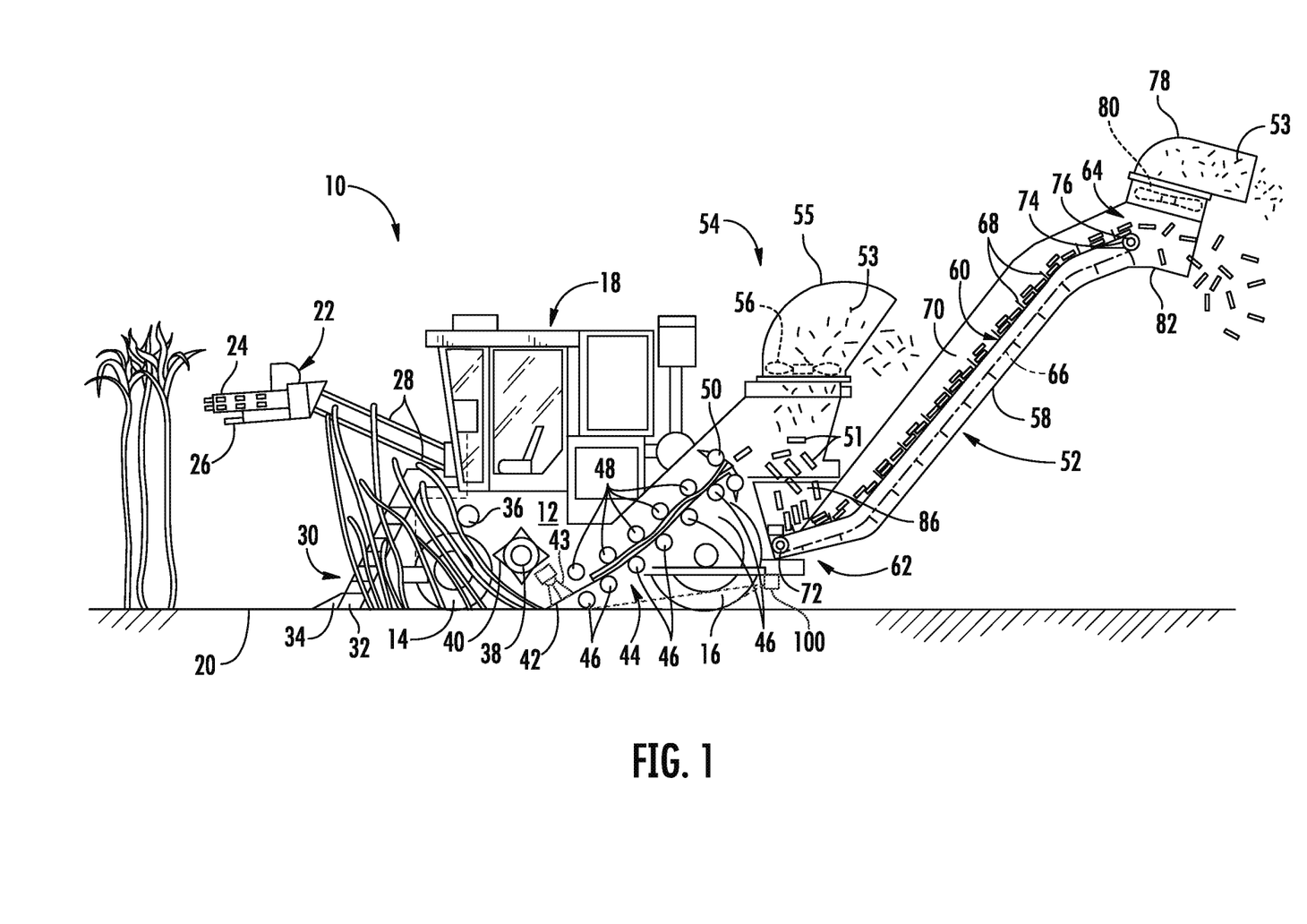
FIG. 1 illustrates a side view of one embodiment of an agricultural harvester in accordance with aspects of the present subject matter.

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame 12, a pair of front wheels 14, a pair of rear wheels 16, and an operator's cab 18. The harvester 10 may also include a primary source of power (e.g., an engine mounted on the frame 12) which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (not shown) configured to generate pressurized hydraulic fluid for powering various hydraulic components of the harvester 10.

The harvester 10 may include various components for cutting, processing, cleaning, and discharging sugarcane as the cane is harvested from an agricultural field 20. For instance, during operation, the harvester 10 is traversed across an agricultural field 20 for harvesting crop, such as sugarcane. The harvester 10 may include a topper assembly 22 positioned at its front end to intercept sugarcane as the harvester 10 is moved in the forward direction. As shown, the topper assembly 22 may include both a gathering disk 24 and a cutting disk 26. The gathering disk 24 may be configured to gather the sugarcane stalks so that the cutting disk 26 may be used to cut off the top of each stalk. As is generally understood, the height of the topper assembly 22 may be adjustable via a pair of arms 28 hydraulically raised and lowered, as desired, by the operator. After the height of the topper assembly 22 is adjusted via the arms 28, the gathering disk 24 on the topper assembly 22 may function to gather the sugarcane stalks as the harvester 10 proceeds across the field 20, while the cutter disk 26 severs the leafy tops of the sugarcane stalks for disposal along either side of harvester 10.

The harvester 10 may further include a crop divider 30 that extends upwardly and rearwardly from the field 20. In general, the crop divider 30 may include two spiral feed rollers 32. Each feed roller 32 may include a ground shoe 34 at its lower end to assist the crop divider 30 in gathering the sugarcane stalks for harvesting. As the stalks enter the crop divider 30, the ground shoes 34 may set the operating width to determine the quantity of sugarcane entering the throat of the harvester 10. The spiral feed rollers 32 then gather the stalks into the throat to allow a knock-down roller 36 to bend the stalks downwardly in conjunction with the action of a fin roller 38. The knock-down roller 36 is positioned near the front wheels 14 and the fin roller 38 positioned behind or downstream of the knock-down roller 36. As the knock-down roller 36 is rotated, the sugarcane stalks being harvested are knocked down. The fin roller 38 may include a plurality of intermittently mounted fins 40 that assist in forcing the sugarcane stalks downwardly. For instance, as the fin roller 38 is rotated, the sugarcane stalks that have been knocked down by the knock-down roller 36 are separated and further knocked down by the fin roller 38 as the harvester 10 continues to be moved in the forward direction relative to the field 20.

Once the stalks are angled downwardly as shown in FIG. 1, a base cutter assembly 42 (hereinafter referred to as "the base cutter 42") may then sever the base of the stalks from field 20. The base cutter 42 is positioned behind or downstream of the fin roller 38. As is generally understood, the base cutter 42 may include knives or blades 43 for severing the sugarcane stalks as the cane is being harvested. The blades 43, located on the periphery of the assembly 42, may be rotated by a hydraulic motor (not shown) powered by the vehicle's hydraulic system. Moreover, in several embodiments, the blades may be angled downwardly to sever the base of the sugarcane as the cane is knocked down by the fin roller 38. Additionally, the height of the base cutter 42 (e.g., of the blades 43) above the field 20 may be adjustable. For instance, as will be described below in greater detail, it is preferable to sever the sugarcane stalks at or below a particular cutting height above the field 20 such that the maximum amount of sugarcane is harvested during the current harvesting operation and such that the remaining ratoons may regrow during the next growing season. As such, the vertical height of the base cutter 42 may be adjustable to maintain the cutting height for harvesting the sugarcane at or below the particular cutting height.

The severed stalks are then, by movement of the harvester 10, directed to a feed roller assembly 44 located downstream of the base cutter 42 for moving the severed stalks of sugarcane from base cutter 42 along the processing path. As shown in FIG. 1, the feed roller assembly 44 may include a plurality of bottom rollers 46 and a plurality of opposed, top pinch rollers 48. The harvested sugarcane may be pinched between various bottom and top rollers 46, 48 to make the sugarcane stalks more uniform and to convey the harvested sugarcane rearwardly (downstream) during transport. As the sugarcane is transported through the feed roller assembly 44, debris (e.g., rocks, dirt, and/or the like) may be allowed to fall through bottom rollers 46 onto the field 20.

At the downstream end of the feed roller assembly 44 (e.g., adjacent to the rearward-most bottom and top rollers 46, 48), a chopper assembly 50 may cut or chop the compressed sugarcane stalks. In general, the chopper assembly 50 may be used to cut the sugarcane stalks into pieces or "billets" 51, which may be, for example, six (6) inches long. The billets 51 may then be propelled towards an elevator assembly 52 of the harvester 10 for delivery to an external receiver or storage device (not shown).

As is generally understood, a primary extractor assembly 54 may be provided to help separate pieces of debris 53 (e.g., dust, dirt, leaves, etc.) from the sugarcane billets 51 before the billets 51 are received by the elevator assembly 52. The primary extractor assembly 54 is located immediately behind or downstream of the chopper assembly 50 relative to the flow of harvested crop and is oriented to direct the debris 53 outwardly from the harvester 10. The primary extractor assembly 54 may include an extractor fan 56 mounted within a housing 55 for generating a suction force or vacuum sufficient to separate and force the debris 53 through an inlet of the housing 55 into the primary extractor assembly 54 and out of the harvester 10 via an outlet of the housing 55. The separated or cleaned billets 51 are heavier than the debris 53 being expelled through the extractor 54, so the billets 51 may fall downward to the elevator assembly 52 instead of being pulled through the primary extractor assembly 54.

As further shown in FIG. 1, the elevator assembly 52 may include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced on the chain 66. The paddles 68 may be configured to hold the sugarcane billets 51 on the elevator 60 as the billets are elevated along a top span of the elevator 70 defined between its proximal and distal ends 62, 64. Additionally, the elevator 60 may include lower and upper sprockets 72, 74 positioned at its proximal and distal ends 62, 64, respectively. As shown in FIG. 1, an elevator motor 76 may be coupled to one of the sprockets (e.g., the upper sprocket 74) for driving the chain 66, thereby allowing the chain 66 and the paddles 68 to travel in an endless loop between the proximal and distal ends 62, 64 of the elevator 60.

Additionally, in some embodiments, pieces of debris or trash 53 (e.g., dust, dirt, leaves, etc.) separated from the elevated sugarcane billets 51 may be expelled from the harvester 10 through a secondary extractor assembly 78 coupled to the rear end of the elevator housing 58. For example, the debris 53 expelled by the secondary extractor assembly 78 may be debris remaining after the billets 51 are cleaned and debris 53 expelled by the primary extractor assembly 54. As shown in FIG. 1, the secondary extractor assembly 78 may be located adjacent to the distal end 64 of the elevator 60 and may be oriented to direct the debris 53 outwardly from the harvester 10. Additionally, an extractor fan 80 may be mounted at the base of the secondary extractor assembly 78 for generating a suction force or vacuum sufficient to pick up the debris 53 and force the debris 53 through the secondary extractor assembly 78. The separated, cleaned billets 51, heavier than the debris 53 expelled through the extractor 78, may then fall from the distal end 64 of the elevator 60. Typically, the billets 51 may fall downwardly through an elevator discharge opening 82 of the elevator assembly 52 into an external storage device (not shown), such as a sugarcane billet cart.

In accordance with aspects of the present subject matter, one or more loss sensors 100 may be supported on the harvester 10. Particularly, the loss sensor(s) 100 may be positioned such that a field of view of the loss sensor(s) 100 is directed toward a portion of the field 20 aft of the base cutter 42, and forward of where the debris 53 separated out by the harvester 10 (e.g., by the extractor assembly(ies) 54, 78) falls back to the field. As such, the loss sensor(s) 100 may be able to generate data indicative of different ground loss conditions during a harvesting operation, as the loss sensor(s) 100 have a relatively unobstructed view of the field surface behind the base cutter 42 and before where the debris 53 is deposited back on the field surface. Preferably, the loss sensor(s) 100 may be configured to generate images or image-like data of the field 20, including ratoons or stumps within the field, fallen stalks or billets, and/or the like, which may be used to determine different ground loss conditions during a harvesting operation, such as non-height related ground losses and, optionally, cut height-related ground losses.

For instance, the loss sensor(s) 100 may correspond to any suitable camera(s), such as single-spectrum camera or a multi-spectrum camera configured to capture images, for example, in the visible light range and/or infrared spectral range. Additionally, in a particular embodiment, the camera(s) may correspond to a single lens camera configured to capture two-dimensional images or a stereo camera(s) having two or more lenses with a separate image sensor for each lens to allow the camera(s) to capture stereographic or three-dimensional images. Alternatively, the imaging device(s) 104 may correspond to any other suitable image capture device(s) and/or other vision sensor(s) capable of capturing "images" or other image-like data of the field. For example, the imaging device(s) 104 may correspond to or include radio detection and ranging (RADAR) sensors and/or light detection and ranging (LI-DAR) sensors.

As will be described in greater detail below, the data from the sensor(s) 100 may be used to automatically identify ground losses during the harvesting operation, then one or more control actions may be performed based on the identified ground losses, for instance, to automatically account for the ground losses and/or to reduce or prevent further ground losses.

Figure 2A:
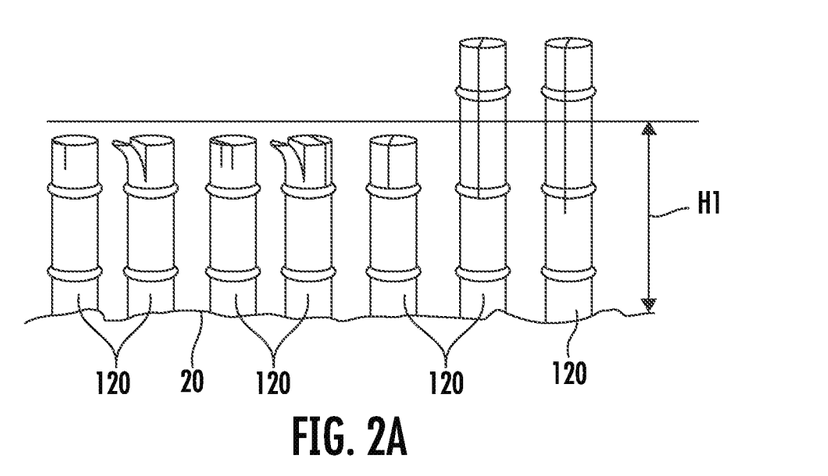
FIGS. 2A-2F illustrate schematic views of different ground losses that may occur during a harvesting operation in accordance with aspects of the present subject matter.

Referring now to FIGS. 2A-2F, schematic views of different ground losses that may occur during a harvesting operation are illustrated in accordance with aspects of the present subject matter. Particularly, FIG. 2A illustrates a series of stumps or ratoons 120 that are left after the base cutter 42 (FIG. 1) works a section of the field 20, particularly illustrating ratoons 120 with varying heights. As indicated above, the remaining stumps 120 preferably have a height that is below a maximum ratoon height threshold H1 (e.g., 5 cm) such that a maximum amount of crop is harvested during the harvesting operation and such that the ratoons may regrow over the course of the next season. As such, stumps that are taller than the maximum ratoon height threshold H1 (e.g., stumps taller than 5 cm), such as the two, right-most stumps 120 in FIG. 2A, are considered a cut height-related ground loss, as there is material remaining that could have been harvested in the current harvesting operation.

Typically, when the stumps are too tall, the cutting height of the base cutter 42 (FIG. 1) is set too high. Accordingly, as will be described in greater detail below, the cutting height of the base cutter 42 may be lowered when stumps are determined to be too tall. It should be appreciated that the maximum ratoon height threshold H1 may be predetermined and/or selected in any suitable manner. For instance, the maximum ratoon height threshold H1 may correspond to the variety of plant being harvested, the field conditions (e.g., moisture content) of the field being harvested, and/or the like.

Figure 2B:
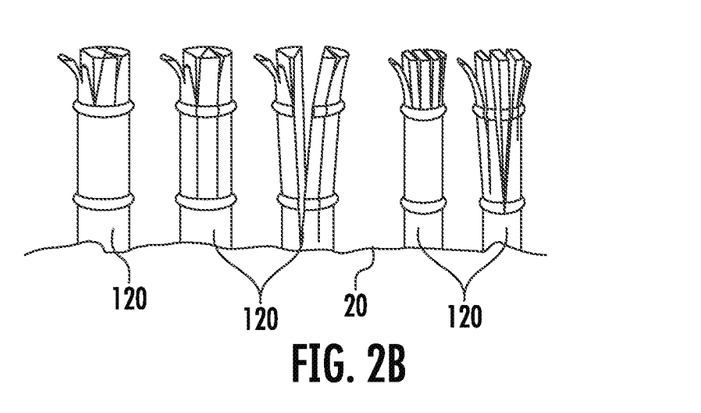

FIG. 2B illustrates another series of ratoons 120 that are left after the base cutter 42 (FIG. 1) works a section of the field 20, particularly illustrating various shattered ratoons 120. When one or more of the blades 43 (FIG. 1) of the base cutter 42 (FIG. 1) become dull, and/or when a ground speed of the harvester 10 is too fast, the base cutter 42 may hit the stalks instead of just cutting the stalks, which causes the stalks to shatter or burst. When the shatter is too severe, such as shown in FIG. 2B, the ratoons may be too damaged to regrow, which affects the yields of subsequent harvesting operations. As such, ratoon shatter is considered a non-height related ground loss. To prevent shattering further ratoons 120 during the harvesting operation, as will be described in greater detail below, the ground speed of the harvester 10 can be reduced and/or the blades 43 (FIG. 1) of the base cutter 42 (FIG. 1) can be replaced.

Figure 2C:
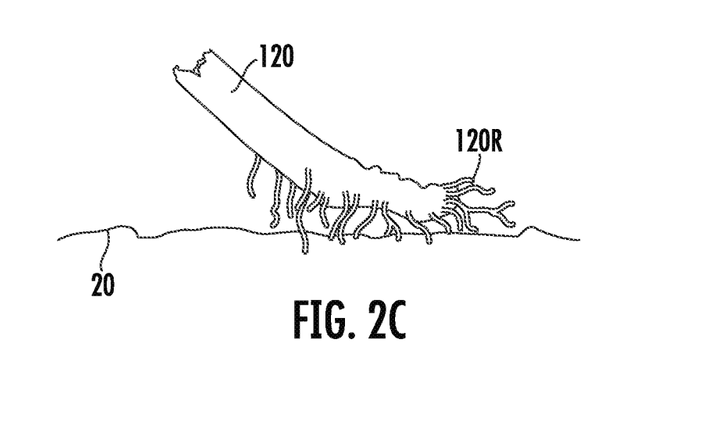

FIG. 2C illustrates another example of a non-height related ground loss, particularly a ratoon 120 that has been at least partially uprooted such that at least some roots 120R of the ratoon 120 are exposed. When the cutting height of the base cutter 42 (FIG. 1) is too low and/or when the ground speed of the harvester 10 is too fast, the roots 120R may not be able to sufficiently counteract the moment on the stalk caused by the blades 43 (FIG. 1) of the base cutter 42 (FIG. 1) contacting the stalk. As such, the stump 120 may be pushed over as the stalk is cut, exposing some of the roots 120R, which may affect the ability for the plant to regrow if not replanted and thus, reducing the potential yield for subsequent harvests. To prevent uprooting further ratoons 120 during the harvesting operation, as will be described in greater detail below, the cutting height of the base cutter 42 (FIG. 1) may be raised and/or the ground speed of the harvester 10 may be reduced.

Figure 2D:
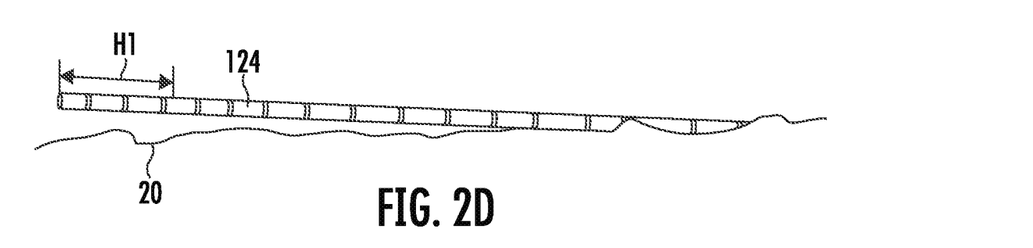

In some instances, a stalk 124 may be knocked or bent over in the field 20 before the harvester 10. The bent over or fixed stalk 124 may not be picked up by the harvester 10 during the harvesting operation, and thus may be left essentially whole within the field, reducing the yield of the harvesting operation. For example, as shown in FIG. 2D, the bottom end of the stalk 124 is still at least partially buried or embedded in the ground such that the top end of the stalk 124 is clearly visible. Further, a length of the stalk 124 is greater than the maximum ratoon height H1. As such, fixed stalks 124 are another example of non-height related ground losses for the current harvesting operation.

Figure 2E:
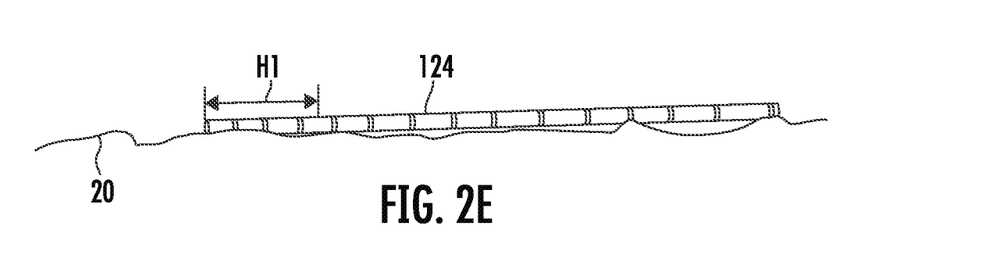
Figure 2F:
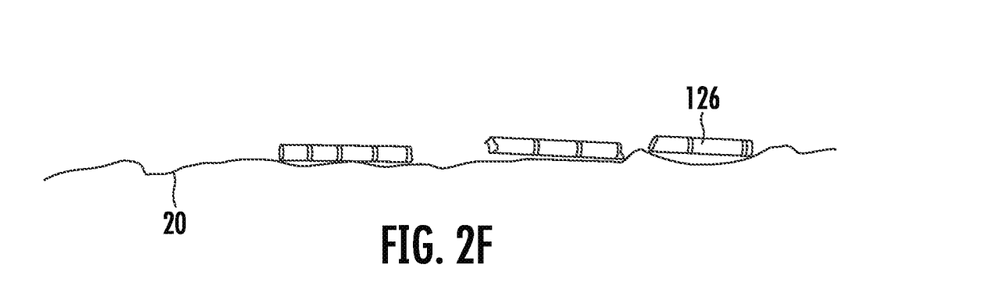

FIGS. 2E and 2F illustrate fallen stalks and fallen stalk segments, respectively. After a stalk 124 is severed by the base cutter 42 (FIG. 1), the stalk 124 is directed toward the feed roller assembly 44 (FIG. 1). However, in some instances, the stalk 124 may pass below the first roller of the feed roller assembly 44 (FIG. 1) and drop as a whole stalk 124 onto the field 20. In such instances, as shown in FIG. 2E, the length of the stalk 124 is greater than the maximum ratoon height H1 and both ends of the stalk 124 may be clearly visible. In other instances, the stalk 124 may break into one or more pieces as it is progressed from the base cutter 42 to the feed roller assembly 44 (FIG. 1), where the pieces of stalk 126 drop onto the field 20, as shown in FIG. 2F. The pieces of stalk 126 may have varying lengths, but typically are much shorter than the whole stalk. As such, fallen stalks and stalk segments also reduce the overall yield of the harvesting operation and are further examples of non-height related ground losses. Fallen stalks and stalk segments may occur when the stalk feeding geometry (e.g., the alignment between the knock-down roller 36 and the base cutter 42) is not ideal and/or when the stalk feeding assembly is not properly cleaned. As will be discussed below, the knock-down roller 36 may be automatically adjustable and/or an operator may be alerted to perform a maintenance check depending on the frequency of such fallen stalks and stalk segments.

Figure 3:
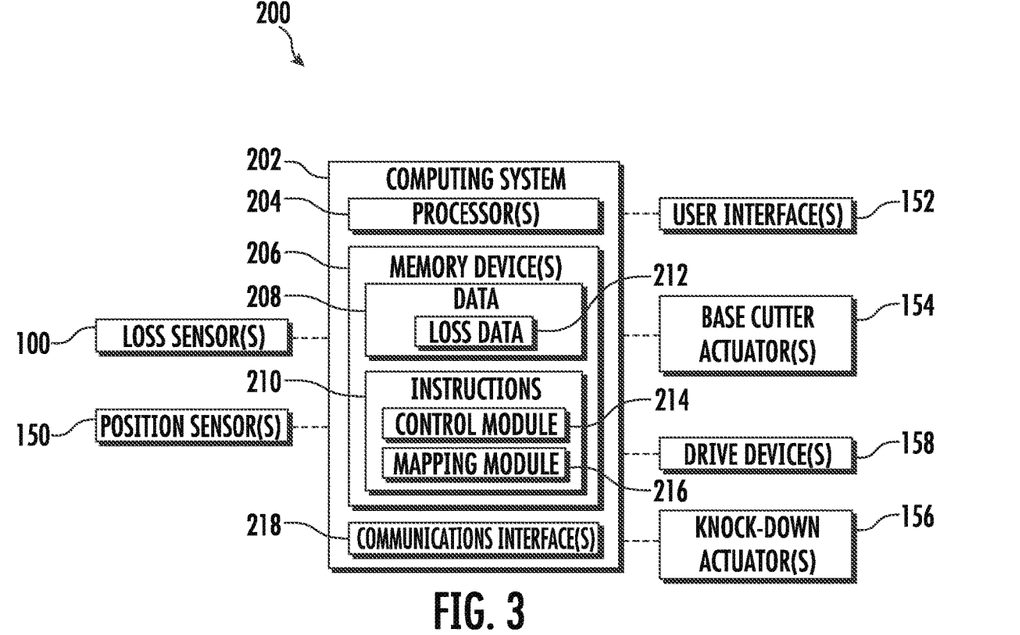
FIG. 3 illustrates a schematic view of a system for automatically determining losses for harvesting operations in accordance with aspects of the present subject matter.

Referring now to FIG. 3, a schematic view of a system 200 for automatically determining losses for harvesting operations is illustrated in accordance with aspects of the present subject matter. In general, the system 200 will be described with reference to the agricultural harvester 10 described with reference to FIG. 1 and to the different examples of ground losses described with reference to FIGS. 2A-2F. However, it should be appreciated that the disclosed system 200 may be implemented with harvesters having any other suitable configurations, and/or with any other suitable types of ground losses.

In several embodiments, the system 200 may include one or more computing systems 202 and various other components configured to be communicatively coupled to and/or controlled by the computing system(s) 202, such as the loss sensor(s) 100, one or more position sensors 150, one or more user interfaces 152, one or more base cutter actuators 154, one or more knock-down roller actuators 156, and/or one or more drive devices 158.

In general, the computing system(s) 202 may correspond to any suitable processor-based device(s), such as a computing device or any combination of computing devices. Thus, as shown in FIG. 3, the computing system(s) 202 may generally include one or more processor(s) 204 and associated memory devices 206 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 206 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 206 may generally be configured to store information accessible to the processor(s) 204, including data 208 that can be retrieved, manipulated, created and/or stored by the processor(s) 204 and instructions 210 that can be executed by the processor(s) 204.

In several embodiments, the data 208 may be stored in one or more databases. For example, the memory 206 may include a loss database 212 for storing loss data received from the loss sensor(s) 100. For instance, the loss sensor(s) 100 may be configured to continuously or periodically capture loss data associated with a portion of a field during a harvesting operation within the field. For instance, as discussed above, the loss sensor(s) 100 may be associated with the harvester 10 configured to perform a harvesting operation within the field 20. Particularly, the loss sensor(s) 100 are configured to generate loss data 212 indicative of ground losses, such as cut height-related ground losses and non-height related ground losses, that are present aft of the base cutter 42 (and forward of where trash is exhausted from the harvester 10). In such an embodiment, the loss data transmitted to the computing system(s) 202 may be stored within the loss database 212 for subsequent processing and/or analysis. It should be appreciated that, as used herein, the term "loss data" may include any suitable type of data received from the loss sensor(s) 100 that allows for the ground losses, particularly the cut height-related ground losses and non-height related ground losses, to be analyzed and/or estimated, as will be described in greater detail below.

It should be appreciated that the loss data 212 may be geo-referenced or may otherwise be stored with corresponding location data associated with the specific location at which such data was collected within the field. In one embodiment, the loss data 212 may be correlated to a corresponding position within the field based on location data received from the positioning sensor(s) 150, which may include a Global Positioning System (GPS) or another similar positioning device(s), configured to transmit a location corresponding to a position of the harvester 10 within the field when the loss data 212 is collected by the loss sensor(s) 100.

Referring still to FIG. 3, in several embodiments, the instructions 210 stored within the memory 206 of the computing system(s) 202 may be executed by the processor(s) 204 to implement a control module 214 and/or a mapping module 216. In general, the control module 214 and/or the mapping module 216 may be configured to analyze the loss data 212 deriving from the loss sensor(s) 100 to determine the locations of different ground losses throughout a field. For instance, as indicated above, the loss data 212 from the loss sensor(s) 100 may include image data and/or image-like data of the portion of the field 20 aft of the base cutter 42. The computing system(s) 202 (e.g., the module(s) 214, 216) may be configured to analyze the images or image-like loss data 212 using any suitable processing techniques (e.g., image processing techniques), relationships, and/or algorithms to determine the different types of ground losses present within the field aft of the base cutter 42. For example, suitable processing or analyzing techniques may include performing spatial analysis on received images or image data. For instance, geometric or spatial processing algorithms, shape detection and/or edge-finding or perimeter-finding algorithms, and/or the like may differentiate the shape, color, edges, and/or the like of ratoons, stalks, or stalk pieces 120, 124, 126 from the field 20 and to further determine one or more ground losses based on one or more of a height of the ratoons 120, a presence of exposed roots 120R, a degree of shatter of the ratoons 120, a length of a stalk(s) 124 and/or a stalk piece(s) 126, and/or the like.

For instance, as indicated above, when the height of one or more ratoons 120 is above a maximum ratoon height threshold H1 (FIG. 2A), the computing system(s) 202 may determine that a cut height-related ground loss is present. It should be appreciated that the maximum ratoon height threshold H1 may be predetermined and stored within the memory 206 of the computing system(s) 202 or may otherwise be provided to the computing system(s) 202. Further, as indicated above, when a degree of the shatter of one or more ratoons 120 is determined to be too severe (e.g., the ratoons have visibly split down the length and/or have a burst end as shown in FIG. 2B), the computing system(s) 202 may determine that a non-height related ground loss is present, particularly shattered ratoons. Moreover, as indicated above, when roots 120R are exposed as shown in FIG. 2C, the computing system(s) 202 may determine that a non-height related ground loss is present, particularly exposed roots. When a knocked down or bent over stalk 124 is detected that has a length greater than the maximum ratoon height H1 and an end at least partially embedded in the ground, a fixed stalk type non-related ground loss is determined to be present. Similarly, when a stalk 124 and/or a portion of a stalk 126 is detected behind the base cutter 42, where, for example, both ends of the stalk 124 or stalk portion 126 are visible, a fallen stalk type and/or a fallen stalk segment type non-related ground loss is determined to be present.

The control module 214 may be configured to automatically initiate a control action in response to the identified ground losses. For instance, the control action may include controlling an operation of the user interface(s) 152 to generally indicate the types of identified ground losses, such as the non-height related ground losses and/or the cut height-related ground losses. The control action may additionally, or alternatively, include controlling an operation of the harvester 10 during the harvesting operation to help prevent further ground losses, when possible.

For instance, as indicated above with reference to FIG. 2A, when the ground losses include a cut height-related ground loss, the control module 214 the control action may include controlling an operation of the base cutter actuator(s) 154 to adjust the cutting height of the base cutter 42. Particularly, the control module 214 may initiate control of the base cutter actuator(s) 154 to lower the cutting height of the base cutter 42 (i.e., to cut the stalks closer to the ground) and, thus, reduce the amount of harvestable stalk left behind.

When the ground losses include shattered ratoons, as indicated above with reference to FIG. 2B, the control module 214 may initiate a control action including controlling an operation of the drive device(s) 158 of the harvester 10 (e.g., the engine, the transmission, brakes, etc.) to reduce a ground speed of the agricultural harvester 10 to reduce or prevent shattering of further ratoons. In some instances, the control action may additionally or alternatively include controlling an operation of the user interface(s) 152 associated with the agricultural harvester 10 to request replacement of blades 43 of the base cutter 42 when the ground losses include shattered ratoons, particularly if further ratoon shatter is identified after reducing the ground speed of the harvester 10.

When the ground losses include exposed roots, as discussed above with reference to FIG. 2C, the control module 214 may automatically initiate a control action including controlling an operation of the base cutter actuator(s) 154 to raise the base cutter 42, controlling an operation of the drive device(s) 158 to reduce the ground speed of the agricultural harvester 10, or both to reduce or prevent ratoons from being knocked over and exposing roots. In some instances, the control action may additionally, or alternatively, include controlling an operation of the user interface(s) 152 associated with the agricultural harvester 10 to request replacement of blades 43 of the base cutter 42. Particularly, in one embodiment, the control action may additionally include controlling an operation of the user interface(s) 152 associated with the agricultural harvester 10 to request replacement of blades 43 of the base cutter 42 if exposed roots are still occurring after raising the base cutter 42 and/or reducing the ground speed of the agricultural harvester 10.

When the ground losses include fixed stalks, as discussed above with reference to FIG. 2D, the control module 214 may initiate a control action including controlling an operation of the user interface(s) 152 to indicate that fixed stalks are present. In some instances, the user interface(s) 152 may only be controlled to indicate that fixed stalks are present when the percentage or number of fixed stalks reaches or exceeds a presence threshold.

When the ground losses include fallen stalks and/or fallen stalk segments, as discussed above with reference to FIGS. 2E and 2F, the control module 214 may automatically initiate a control action including controlling an operation of the knock-down roller actuator(s) 156 to adjust the geometry of the feed system of the harvester 10 and/or controlling an operation of the user interface(s) 152 to notify an operator that a maintenance operation needs to be performed of the feed system of the harvester 10. In some instances, the notifications for the operator may increase in intensity or frequency depending on the intensity or frequency of the presence of fallen stalks and/or fallen stalk segments.

Further, in some embodiments, the computing system(s) 202 may be configured to determine at least one of a quantity or a volume of the ground losses. Particularly, the computing system(s) 202 may be configured to determine a quantity or a volume of the non-height related ground losses, of each type of non-height related ground loss, and/or of the cut height-related ground losses. The control module 214 may then be configured to control an operation of the user interface(s) 152 to indicate the quantity and/or volume of the identified ground losses. The computing system(s) 202 may additionally, or alternatively, estimate a percentage of the total ground losses compared to the total harvesting volume, a percentage of each ground loss type compared to the total harvesting volume, and/or the like based at least in part on the loss data 212 and yield data from a harvesting monitor. The control module 214 may then be configured to control an operation of the user interface(s) 152 to indicate the percentage(s). The computing system(s) 202 may further be configured to determine an estimated yield for a subsequent harvesting operation within the field based at least in part on the ground losses, particularly, the non-height related ground losses. For instance, as indicated above, when ratoons are shattered and/or uprooted, they may not be able to grow back into stalks of the previous height. As such, future harvesting operations may have reduced yields when there are certain non-height related ground losses. The control module 214 may then be configured to control an operation of the user interface(s) 152 to indicate the future harvesting yield estimation or future yield reduction estimation.

The control action may additionally, or alternatively, include automatically generating a management report based at least in part on the loss data. For instance, the management report may include a quantity or a volume of the ground losses (e.g., a quantity or a volume of the non-height related ground losses and/or the cut height-related ground losses), percentage of the ground losses (e.g., of the non-height related ground losses and/or the cut height-related ground losses), estimated yield, and/or the like for the harvester 10 which may be used to help identifying root cause of the losses. In some embodiments, the management report may be generated based at least in part on loss data from multiple harvesters 10. In such embodiments, the management report may rank the different harvesters 10, operators, fields, operation methods, and/or the like based at least in part on the loss data. By aggregating data from multiple harvesters 10, field maps for subsequent operations in the field(s) may be more easily generated. Such management report may be displayed to an operator of the harvester in real time, may be transmitted to another computing system, and/or stored for later use.

Figure 4:
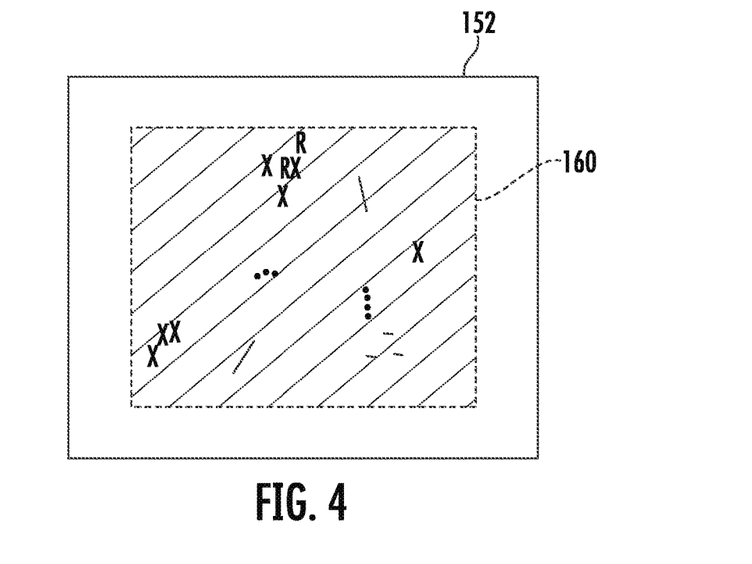
FIG. 4 illustrates an example of a loss map indicating ground losses from a harvesting operation in accordance with aspects of the present subject matter.

The mapping module 216 may also be configured to automatically initiate a control action in response to the identified ground losses. More particularly, the mapping module 216 may be configured to generate a loss map 160 indicating a position of each of the identified ground losses within the field based at least in part the loss data 212. In one embodiment, the mapping module 216 may indicate the different types of the identified ground losses on the loss map 160, particularly the different non-height related ground losses and/or the cut height-related ground losses. For example, as shown in FIG. 4, shattered ratoons may be shown with an "X," exposed roots may be shown with an "R," stumps that are too tall compared to the maximum ratoon height threshold may be shown with a small circle, and fixed or fallen stalks or stalk segments may be shown with lines having corresponding or scaled lengths. However, it should be appreciated that these examples should not be construed as limiting. The generated loss map 160 may be displayed on the user interface(s) 152 and/or on any other suitable device.

Referring back to FIG. 3, the computing system(s) 202 may also include a communications interface 218 to provide a means for the computing system(s) 202 to communicate with any of the various system components described herein. For instance, one or more communicative links or interfaces (e.g., one or more data buses) may be provided between the communications interface 218 and the loss sensor(s) 100 to allow loss data transmitted from the loss sensor(s) 100 to be received by the computing system(s) 202. Similarly, one or more communicative links or interfaces (e.g., one or more data buses) may be provided between the communications interface 218 and the position sensor(s) 150 to allow the position data transmitted from the position sensor(s) 150 to be received by the computing system(s) 202. Additionally, as will be described below, one or more communicative links or interfaces (e.g., one or more data buses) may be provided between the communications interface 218 and any system components configured to carry out one or more of the elements of the disclosed method. For example, as illustrated, the computing system(s) 202 may be communicatively coupled via one or more communicative links or interface(s) between the user interface(s) 152, base cutter actuator(s) 154, knock-down roller actuator(s) 156, and drive device(s) 158 and the communications interface(s) 218.

It should be appreciated that the computing system(s) 202 may correspond to an existing controller of the harvester 10. For instance, the computing device(s) 202 may correspond to a harvester controller of the harvester 10. However, the computing device(s) 202 may also correspond to a controller of one or more remote control devices separate from the harvester 10, such as part of a base station local to the field or part of a remote cloud-based computing system located remote to the field.

Figure 5:
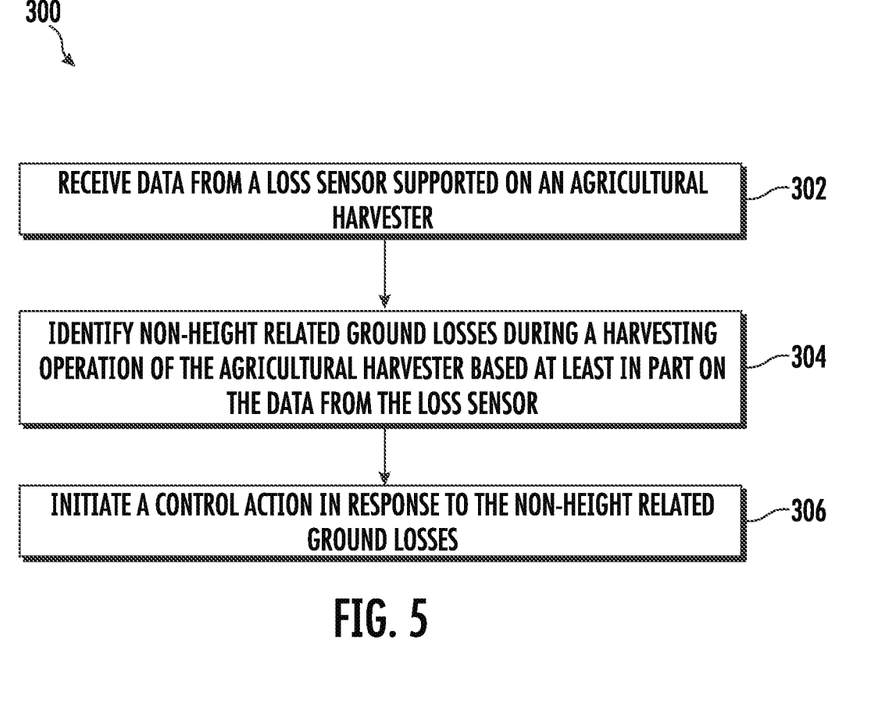
FIG. 5 illustrates a flow diagram of one embodiment of a method for automatically determining losses for harvesting operations in accordance with aspects of the present subject matter.

Referring now to FIG. 5, a flow diagram of one embodiment of a method 300 for automatically determining losses for harvesting operations is illustrated in accordance with aspects of the present subject matter. In general, the method 300 will be described herein with reference to the harvester 10 described with reference to FIG. 1, the example ground losses described with reference to FIGS. 2A-2F, and the system 200 described with reference to FIG. 3. However, it should be appreciated that the disclosed method 300 may be implemented with harvesters 10 having any other suitable configuration, with any other suitable ground losses, and/or with systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include receiving data from a loss sensor supported on an agricultural harvester. For instance, as described above, the computing system(s) 202 may receive data from the loss sensor(s) 100 supported on the agricultural harvester 10, where the loss sensor(s) 100 have a field of view directed aft of a base cutter 42 of the harvester 10.

Further, at (304), the method 300 may include identifying non-height related ground losses during a harvesting operation of the agricultural harvester based at least in part on the data from the loss sensor. For example, as discussed above, the computing system(s) 202 may identify non-height related ground losses (e.g., exposed roots, shattered ratoons, fixed stalks, fallen stalks, or fallen stalk segments) during a harvesting operation of the agricultural harvester 10 based at least in part on the data from the loss sensor(s) 100.

Additionally, at (306), the method 300 may include initiating a control action in response to the non-height related ground losses. For instance, as discussed above, the computing system(s) 202 may initiate a control action in response to the non-height related ground losses, where the control action may include one or more of controlling an operation of the base cutter 42 to raise the base cutter 42, controlling an operation of the drive device(s) 158 of the harvester 10 to reduce a ground speed of the harvester 10, or controlling an operation of the user interface(s) 152.

It is to be understood that the steps of the method 300 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 300, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural system for automatically determining losses for harvesting operations, the agricultural system comprising:
    a loss sensor supported on an agricultural harvester and having a field of view directed toward a portion of a field aft of a base cutter of the agricultural harvester, the loss sensor being configured to generate data indicative of ground losses; and
    a computing system communicatively coupled to the loss sensor, the computing system being configured to:
        identify non-height related ground losses during a harvesting operation of the agricultural harvester based at least in part on the data generated by the loss sensor; and
        initiate a control action in response to the non-height related ground losses.

2. The agricultural system of claim 1, wherein the non-height related ground losses includes one or more of exposed roots, shattered ratoons, fixed stalks, fallen stalks, or fallen stalk segments.

3. The agricultural system of claim 1, wherein the control action includes automatically controlling an operation of the agricultural harvester to at least one of raise the base cutter or reduce a ground speed of the agricultural harvester when the non-height related ground losses include exposed roots.

4. The agricultural system of claim 1, wherein the control action includes automatically controlling an operation of the agricultural harvester to reduce a ground speed of the agricultural harvester when the non-height related ground losses include shattered ratoons.

5. The agricultural system of claim 1, wherein the control action includes automatically controlling an operation of a user interface associated with the agricultural harvester to request replacement of blades of the base cutter when the non-height related ground losses include at least one of shattered ratoons or exposed roots.

6. The agricultural system of claim 1, wherein the computing system is further configured to:
    identify cut height-related ground losses during the harvesting operation based at least in part on the data generated by the loss sensor, wherein the cut height-related ground losses includes a cut height of the base cutter being too high; and
    automatically controlling an operation of the agricultural harvester to adjust the cut height of the base cutter in response to the cut height-related ground losses.

7. The agricultural system of claim 1, wherein the control action includes automatically generating a report based at least in part on the non-height related ground losses.

8. The agricultural system of claim 1, wherein the computing system is further configured to determine at least one of a quantity or a volume of the non-height related ground losses.

9. The agricultural system of claim 1, wherein the computing system is further configured to determine an estimated yield for a subsequent harvesting operation within the field based at least in part on the non-height related ground losses.

10. The agricultural system of claim 1, wherein the control action includes generating a loss map correlating locations within the field to the non-height related ground losses.

11. The agricultural system of claim 1, wherein the loss sensor comprises at least one camera.

12. An agricultural method for automatically determining losses for harvesting operations, the agricultural method comprising:
receiving, with a computing system, data from a loss sensor supported on an agricultural harvester, the loss sensor having a field of view directed toward a portion of a field aft of a base cutter of the agricultural harvester;
identifying, with the computing system, non-height related ground losses during a harvesting operation of the agricultural harvester based at least in part on the data from the loss sensor; and
initiating, with the computing system, a control action in response to the non-height related ground losses.

13. The agricultural method of claim 12, wherein the non-height related ground losses including one or more of exposed roots, shattered ratoons, fixed stalks, fallen stalks, or fallen stalk segments.

14. The agricultural method of claim 12, wherein initiating the control action includes automatically controlling an operation of the agricultural harvester to at least one of raise the base cutter or reduce a ground speed of the agricultural harvester when the non-height related ground losses include exposed roots.

15. The agricultural method of claim 12, wherein initiating the control action includes automatically controlling an operation of the agricultural harvester to reduce a ground speed of the agricultural harvester when the non-height related ground losses include shattered ratoons.

16. The agricultural method of claim 12, wherein initiating the control action includes automatically controlling an operation of a user interface associated with the agricultural harvester to request replacement of blades of the base cutter when the non-height related ground losses include at least one of shattered ratoons or exposed roots.

17. The agricultural method of claim 12, further comprising identifying cut height-related ground losses during the harvesting operation based at least in part on the data generated by the loss sensor, wherein the cut height-related ground losses includes a cut height of the base cutter being too high; and
automatically controlling an operation of the agricultural harvester to adjust the cut height of the base cutter in response to the cut height-related ground losses.

18. The agricultural method of claim 12, wherein initiating the control action includes automatically generating a report based at least in part on the non-height related ground losses.

19. The agricultural method of claim 12, further comprising determining at least one of a quantity or a volume of the non-height related ground losses.

20. The agricultural method of claim 12, wherein initiating the control action includes generating a loss map correlating locations within the field to the non-height related ground losses.

* * * * *